United States Patent [19]

Plankenhorn et al.

[11] Patent Number: 4,828,384
[45] Date of Patent: May 9, 1989

[54] HIGH POWER LASER BEAM INTENSITY MAPPING APPARATUS

[75] Inventors: Daniel J. Plankenhorn, Palo Alto; Victor G. Gregson, Cupertino; John G. Horne, Lafayette, all of Calif.

[73] Assignee: Westinghouse Electric Corp., Pittsburgh, Pa.

[21] Appl. No.: 128,548

[22] Filed: Dec. 3, 1987

[51] Int. Cl.[4] .............................................. G01J 1/00
[52] U.S. Cl. .................................... 356/121; 350/6.2; 374/32
[58] Field of Search ............... 356/121, 122, 123, 225; 350/6.1, 6.2, 273, 274, 271, 272; 250/334, 338.3, 351, 353; 374/31, 32, 130; 219/121 LP, 121 LZ, 121.73, 121.83; 358/204

[56] References Cited

U.S. PATENT DOCUMENTS

| | | | |
|---|---|---|---|
| 3,072,740 | 1/1963 | Astheimer | 358/204 |
| 3,733,499 | 5/1973 | Deis et al. | 250/338.3 |
| 3,867,036 | 2/1975 | Detwiler et al. | 356/121 |
| 3,894,804 | 7/1975 | Detwiler et al. | 356/121 |
| 4,243,325 | 1/1981 | Ernst | 350/272 |
| 4,442,357 | 4/1984 | Baker et al. | 250/351 |

FOREIGN PATENT DOCUMENTS

| | | | |
|---|---|---|---|
| 35987 | 9/1972 | Japan | 356/121 |
| 160633 | 12/1981 | Japan | 356/121 |

*Primary Examiner*—Richard A. Rosenberger
*Attorney, Agent, or Firm*—D. Schron

[57] ABSTRACT

A scanning system which obtains and displays the spatial energy distribution of a high power laser beam. The beam to be examined is directed toward two knife-edge mirrors arranged to pass only a thin vertical segment of the beam and to reflect the remainder of the beam to power absorbers. The mirrors are scanned across the beam, and a scanning disk having helical slots therein samples the vertical segment, and these samples are directed by means of a paraboloid mirror toward a detector responsive to the wavelength of the laser beam. The output of the detector is placed into storage and thereafter displayed on a high resolution color monitor with different colors representing different energy levels or as a simulated three dimensional display so that an operator may obtain an indication of the spatial energy distribution of the laser beam under examination.

17 Claims, 6 Drawing Sheets

HIGH POWER LASER BEAM INTENSITY MAPPING APPARATUS

BACKGROUND OF THE INVENTION

1. Field of the Invention

The invention in general relates to the field of industrial lasers or other high energy systems, and more particularly to apparatus for obtaining an indication of the spatial energy density distribution of the beam generated in such apparatus.

2. Description of the Prior Art

High power lasers are utilized in industry to perform a wide variety of material processing operations such as welding, cutting, heat-treating, and surface alloying and cladding, by way of example.

Very often in such laser systems, the energy density over the entire cross section of the beam may not be uniform, and such non-uniformity may have a profound effect on the laser-processing task. Accordingly, a precise measure of the beam spatial energy distribution is of utmost importance because of its impact on consistency and repeatability with respect to, for example, the depth of penetration in welding, the speed and kerf width in cutting, temperature distribution in heat-treating, as well as other effects from laser operations.

One conventional technique to measure the spatial energy distribution of a high power laser beam utilizes a material that ablates or combusts when placed in the beam path. Material utilized in this test include wood, plexiglass and silicon brick, by way of example, and the resulting burn pattern in the material is then analyzed subjectively. This technique, although inexpensive, does not give a quantitative result but only a comparative result, in which the result may vary, depending upon the person who analyzes the pattern.

Another technique utilizes the laser to irradiate a target of suitable material and thereafter observe the secondary radiation therefrom by means of a detector, such as an infrared camera in the case of black-body radiation, or a heat-sensitive fluorescent screen, with ultraviolet sources. The accuracy and resolution of this technique are affected by the properties of the target material and the results may vary, depending upon parameters such as absorptivity, emissivity and thermal conductivity.

Scanning techniques for determining the spatial energy distribution utilize a scanning disk, blade, rod or wire to sample a portion of the beam. This technique is limited to low power lasers, which are generally less than 5 kilowatts (kW) and which do not achieve energy densities in excess of $10^5$ Watts/cm$^2$. Use with higher power lasers would require an attenuating filter or other method of reducing energy density. Further, the resulting resolution with this technique is somewhat degraded because of the poor optical resolution resulting from diffraction caused by edges of the blade or wire.

A two-dimensional spatial energy distribution may be obtained with the use of an array of detectors placed in the beam path. Due to the physical size of the detectors, the spatial resolution is relatively poor and attenuating filters are required for use with higher power lasers.

The present invention is operable to precisely map the spatial energy density distribution of a high power, multi-kilowatt energy beam, such as a laser, over a two-dimensional plane perpendicular to the beam's optical axis, with a resolution heretofore unattainable.

SUMMARY OF THE INVENTION

The apparatus includes a first means for scanning a high power energy beam in a first direction and being constructed and arranged to pass only a slit-shaped segment of the beam and to reflect the unpassed remainder of the beam. Energy-absorbing means is provided in the path of this reflected portion of the beam to dissipate the reflected energy. A second means is provided for scanning, in a second direction, the passed slit-shaped segment and is constructed and arranged to pass, at any instant of time, only a small elemental portion of the beam. The resulting thru-put beam segment has a square geometry. Detector means is provided and includes a detector device operable to provide an output signal upon impingement of the particular segment of the beam being analyzed, and means are provided for directing the small elemental portion of the beam, passed by the second scanning means, to impinge upon the detector. A synchronized device is provided to allow progressive segments of the sampled beam to impinge upon the detector without overlap. Means responsive to the detector output signal provided during the scanning is operable to provide an indication of the energy distribution of the beam. In a preferred embodiment, the detector output signals are converted to a digital format, stored in a computer memory and thereafter displayed as a two-dimensional pattern on a high resolution color monitor wherein different intensities are displayed as different colors.

DESCRIPTION OF THE PREFERRED EMBODIMENT

The present invention is applicable for obtaining the spatial energy distribution of a high energy beam and will be described by way of example with respect to a laser.

Figure 1:
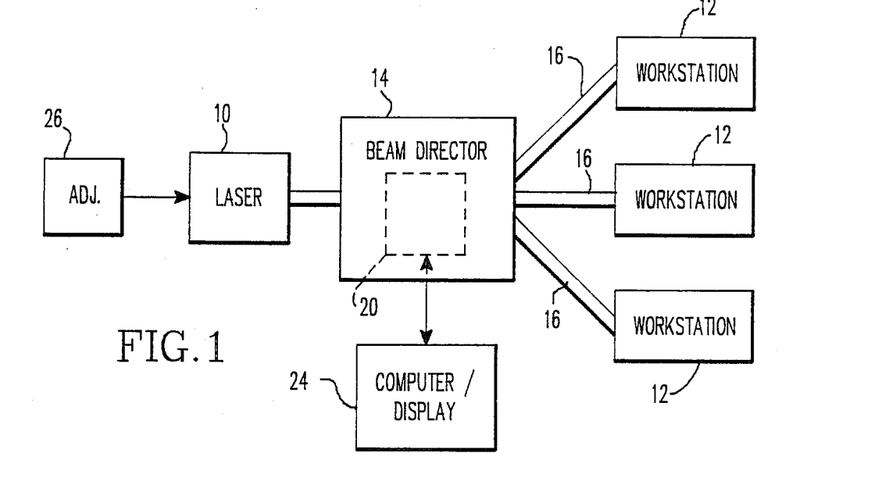
FIG. 1 is a block diagram of a high power industrial laser installation.

FIG. 1 illustrates an industrial system which utilizes a laser 10, an example of which is a carbon dioxide laser which produces a continuous output high power laser beam in the order of 15 kW or more.

One or more workstations 12 is provided for performing an industrial task which utilizes the high energy laser beam. In order to guide the laser beam to a particular workstation 12, a beam director 14 is provided and generally includes a water-cooled mirror system which is adjustable so as to direct the high-powered beam through one of a plurality of ducts 16 to the appropriate workstation 12.

Ideally, it is desired that the energy distribution across the beam be a fundamental mode distribution so that the focusing of the beam at the workstation is uniform, predictable and repeatable. In actual practice, however, the beam characteristic is such that the energy distribution is non-uniform and it would be desirable to obtain an indication of the non-uniformity so that correction can be made. The present invention performs this function and includes a scanning subsystem 20 which is placed in the path of the high power laser beam and which generates information relative to the beam for use by a computer and display apparatus 24 so that an operator may adjust the laser by means of adjustment apparatus 26 to obtain a more desirable spatial energy distribution. FIG. 1 illustrates by way of example the scanning subsystem 20 being positioned within the beam director 14. With a suitable housing and connections, the scanning apparatus could also be coupled to one of the beam ducts 16, or even placed within an individual workstation 12.

Figure 2:
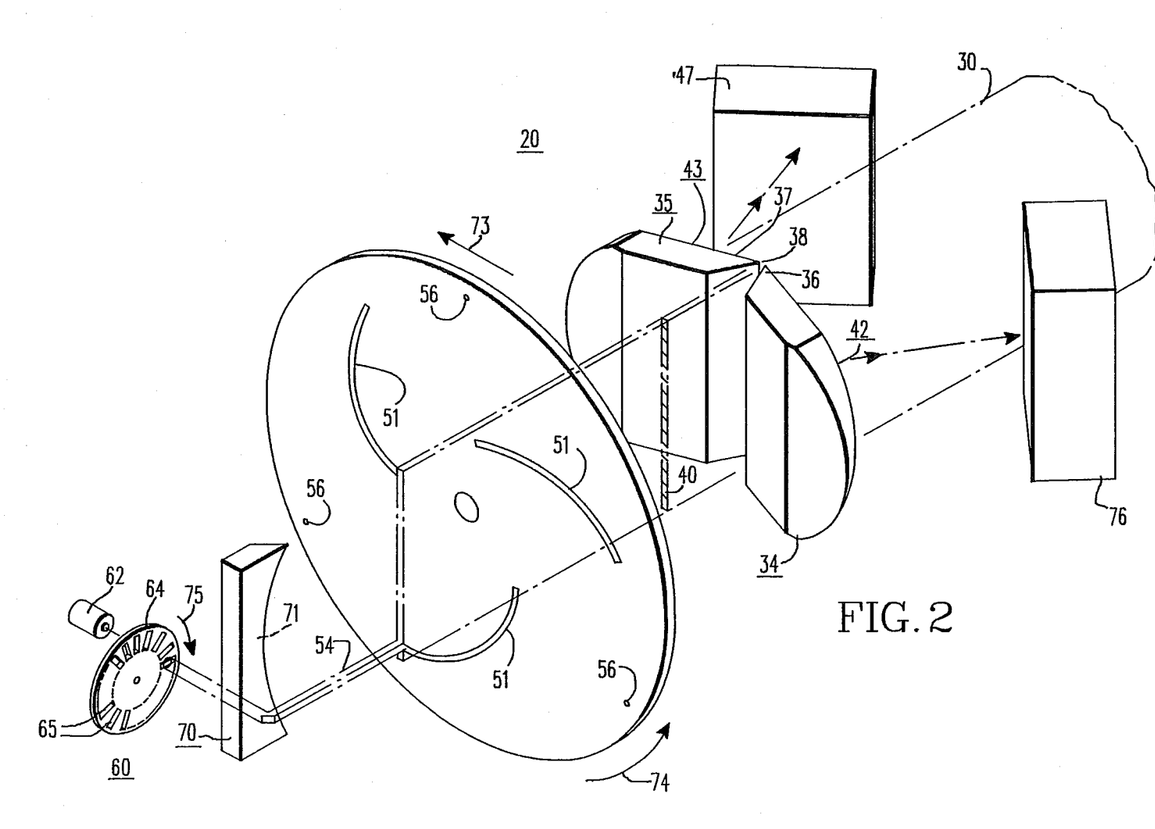
FIG. 2 is a simplified illustration of one embodiment of the present invention.

FIG. 2 illustrates some components of the scanning subsystem 20. In FIG. 2 the high intensity laser beam is indicated by the numeral 30 and is illustrated by way of example as being cylindrical, thereby having a circular cross section, although it is to be understood that beams with other cross-sectional shapes may be produced and analyzed.

Means are provided for scanning the beam in a first direction and includes first and second mirrors 34 and 35 having respective knife edges 36 and 37 arranged relative to one another to form a narrow slit 38 such that in response to impingement of the beam 30, structures 34 and 35 will allow only a slit-shaped segment of the beam to pass, the slit-shaped segment being indicated by numeral 40.

The mirrors 34 and 35 may be made of solid copper having respective highly reflective surfaces 42 and 43 for reflecting the unpassed remainder of the beam 30 to respective energy-absorbing means 46 and 47, preferably water-cooled power absorbers.

Means for scanning the passed beam in a second direction includes a rotating disk 50 having a plurality of helical slots 51 each designed to intercept and pass, at any instant of time, only a small elemental portion of the slit-shaped segment 40. The disk includes apertures 56 utilized for timing purposes, as will be explained hereinafter. The impingement of segment 40 upon disk 50 is represented by the dot-dash rectangle 40' such that the helical slot intersects the segment 40 at a constant right angle and passes a nominally square cross-sectioned-shaped beam 54.

Each elemental sample of beam, such as 54, is directed to a detector means 60 which includes a detector device 62 of the type which is responsive to the wavelength of the beam (IR in the case of a carbon dioxide laser) and is operable to provide a corresponding output signal indicative of the intensity of the impinging beam. As will be described, the detector means additionally includes a chopper disk 64 having a plurality of slots 65 formed therein to periodically interrupt the beam to be sampled and to provide a timing signal.

The means for directing the beam sample 54 to the detector means 60 is illustrated by way of example as a reflector 70 having a surface 71 which is a segment of an off-axis paraboloid spatially arranged such that any segment of beam passed by a scanning slot 51 as disk 50 rotates will be focused so as to be received by detector 62. The use of this stationary reflector with its particular curvature, therefore, eliminates the need for synchronizing the movement of a planar type mirror or the detector.

During operation, the components illustrated in FIG. 2, except for the energy absorbers 46 and 47, move as a unit in the direction of arrow 73 to thereby progressively scan across laser beam 30, which is also stationary. Rotation of disk 50 in the direction of arrow 74 accomplishes the scanning in a second direction while rotation of chopper disk 64 in the direction of arrow 75 results in the desired output signal of detector 62.

Figure 3:
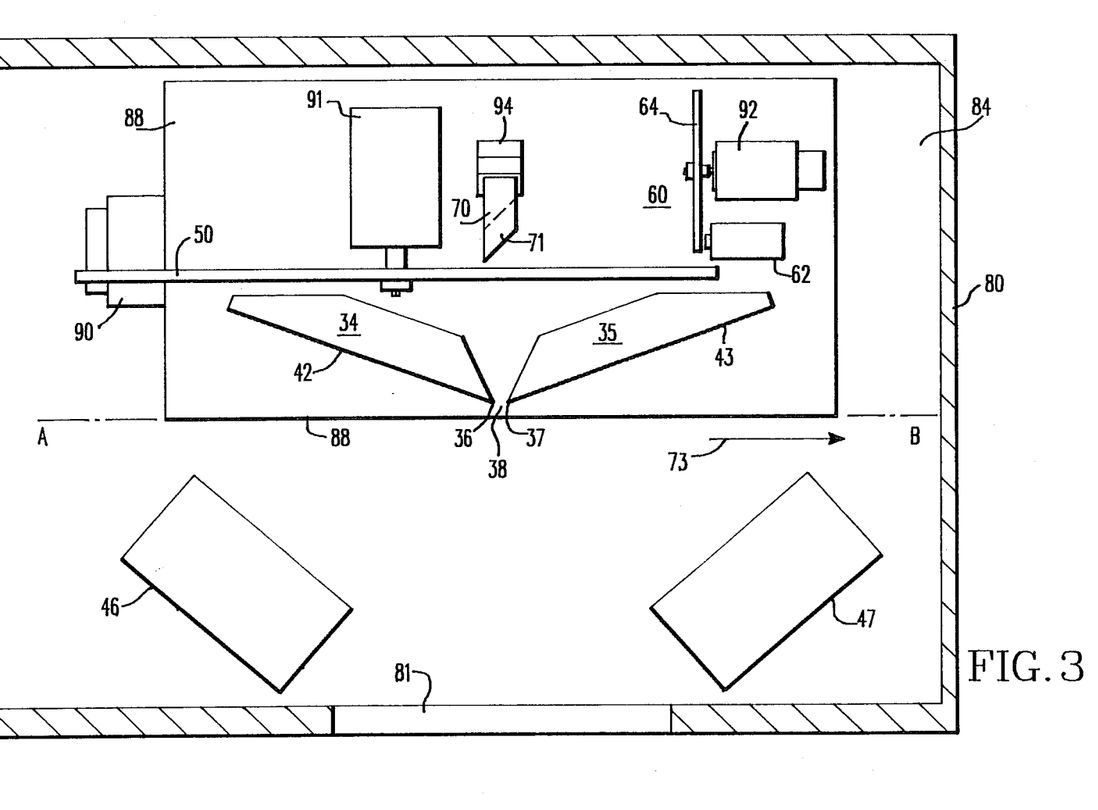
FIG. 3 is a plan view in somewhat more detail of the apparatus illustrated in FIG. 2.

The apparatus is illustrated in somewhat more detail in plan view in FIG. 3 wherein the components are positioned within a housing 80 having an entrance 81 which is placed in the path of the laser beam to be examined.

The housing includes a base or floor 84 having positioned thereon a moving one-axis table (not illustrated) to accommodate linear movement of a sliding plate 88 mounted on the table and driven in a linear manner in the direction of arrow 73 by means of a drive motor 90. The one-axis table is well-known to those skilled in the art and operates such that the plate 88 is driven between limits A (at the start of a scan) and B (at the termination of a scan).

With the exception of energy absorbers 46 and 47, which may be affixed to base 84, and the one-axis table drive 90, the components illustrated in FIG. 2 are all mounted and moved as a unit on sliding plate 88. FIG. 3 further shows drive motor 91 for rotating disk 50 as well as drive motor 92 for chopper disk 64. Reflector 70 is illustrated as being held in position by means of a reflector mount 94 affixed to the sliding plate 88.

Figure 4A:
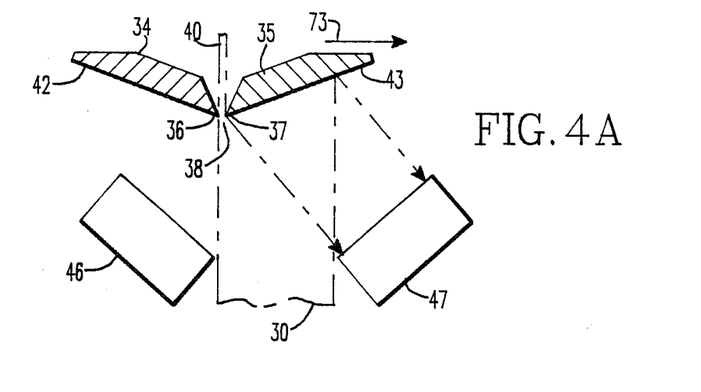
FIGS. 4A through 4C illustrate a portion of the apparatus in a first scanning mode.
Figure 4B:
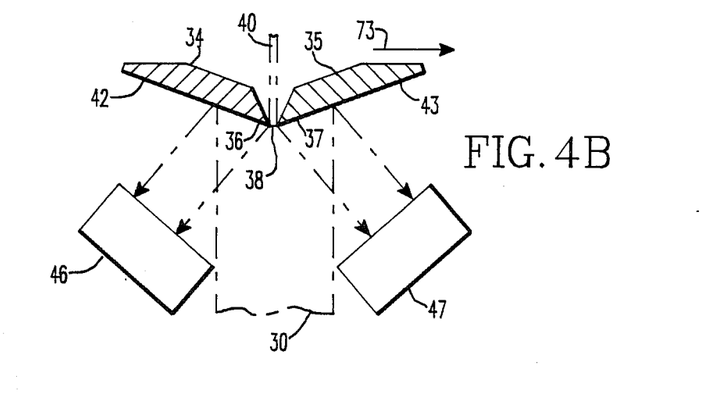
Figure 4C:
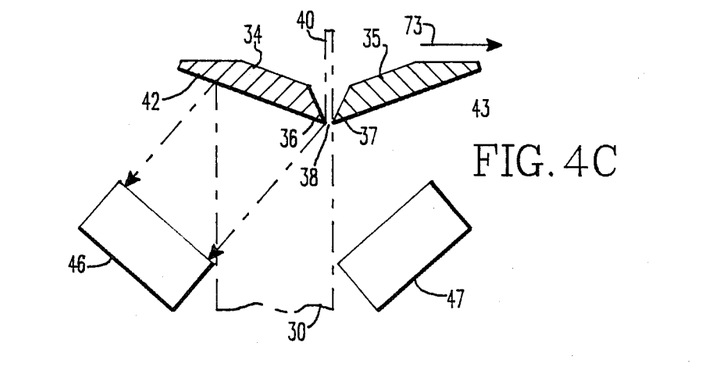

FIGS. 4A through 4C illustrate the scanning process in a first or horizontal direction. Laser beam 30 enters the housing (not illustrated) between energy absorbers 46 and 47, and in FIG. 4A knife-edge mirrors 34 and 35 have moved from a rest position to the edge of beam 30 whereby the vertical slit 38 formed by knife edges 36 and 37 allow passage of the slit-shaped segment 40. At this point in the scan, reflecting surface 43 of mirror 35 reflects the remainder of the beam energy to energy absorber 47.

FIG. 4B illustrates the arrangement in the midpoint of the horizontal scan whereby energy absorbers 46 and 47 both receive the same amount of reflected energy from respective surfaces 42 and 43. At the end of the scan, as illustrated in FIG. 4C, energy absorber 46 receives all of the reflected remainder of the beam and at this point after the last segment 40 in the scanning process has been passed, sliding plate 88 may be driven to a home position A illustrated in FIG. 3.

Figure 5:
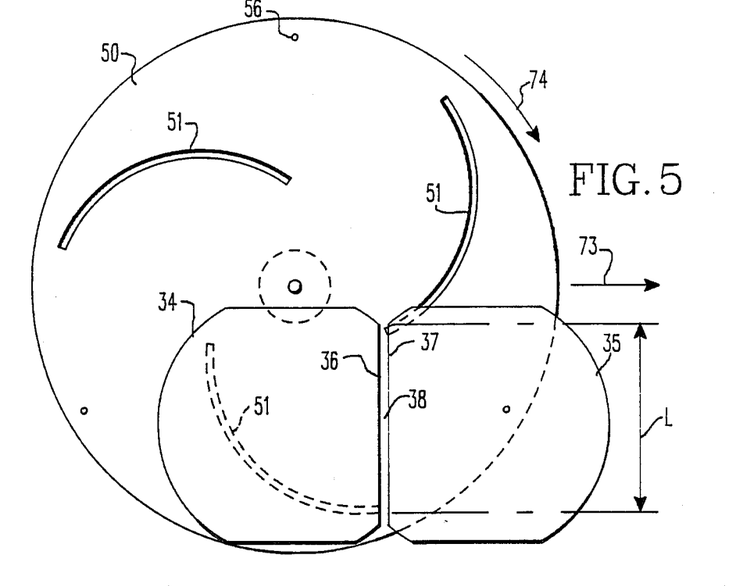
FIG. 5 illustrates a portion of the apparatus in a second scanning mode.

Scanning in a second or vertical direction is further illustrated in FIG. 5. During the start of a vertical scan, the initial portion of a helical slot 51 crosses the vertical slit 38 formed by knife edges 36 and 37 at right angles so as to allow a first sample of the beam to pass through disk 50. Continued rotation of the disk 50 allows successive samples to pass through, such that a vertical scan of length L is completed for each helical slot. A constant angular velocity of disk 50 produces a constant vertical linear scanning velocity of the beam.

Figure 6:
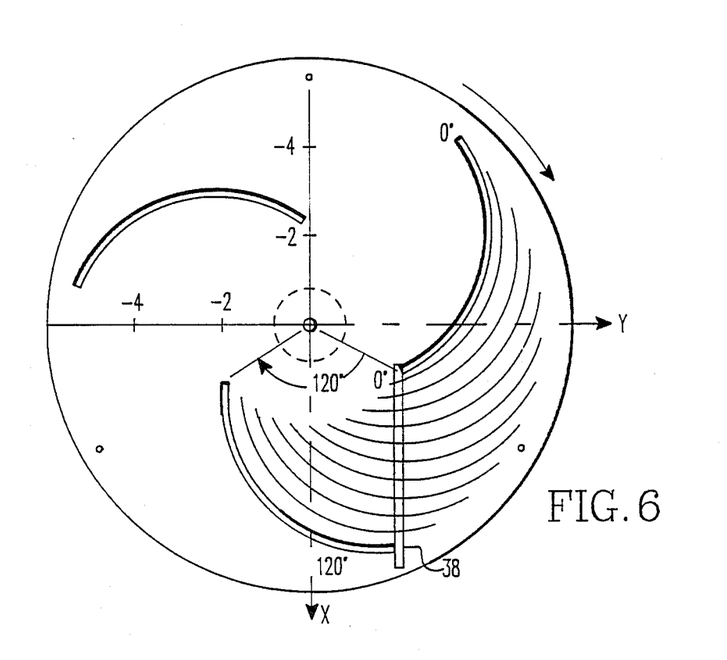
FIG. 6 illustrates a scanning operation utilized herein.

With additional reference to FIG. 6, each helical slot is formed along a helical curve illustrated in FIG. 5 at successive 10° angular increments intersecting the vertical slit 38 formed by knife edges 36 and 37 and superimposed on the figure. The helical curve may be defined by the following equation:

$$x = \left[\frac{6}{\pi}\alpha + 1\right]\cos\alpha - \frac{6}{\pi}\sin\alpha$$

$$y = \left[\frac{6}{\pi}\alpha + 1\right]\sin\alpha + \frac{6}{\pi}\cos\alpha$$

where $$0 \leq \alpha \leq \frac{2\pi}{3}$$

For the high power carbon dioxide laser example, the detector device 62 must be of the type to respond to IR energy. One type of commercially available detector to accomplish this is a lithium tantalate pyroelectric detector which has the attributes of high frequency response, tolerance to overload and good linearity and sensitivity. This particular detector, however, is an AC device responding only to changes in the level of the incident energy. Since the beam being measured is CW, the beam must be periodically interrupted to provide an AC signal for the detector. This function is accomplished by the chopper disk 64, further illustrated in FIG. 7.

By way of example, let it be assumed that the width of the slot 38 formed by the knife edges of mirrors 34 and 35 is 1/32 inch (0.793 mm) and the length L is 4 inches (101.6 mm). If the width of each helical slot 51 is also 1/32 inch (0.793 mm), then a nominally square sample 1/32×1/32 inch results (0.793×0.793 mm). If the sliding plate 88 advances at a constant velocity of 1/32 inch (0.793 mm) per 1/30 of a second, then a 4-inch (101.6 mm) beam is scanned in 4 and 4/15 seconds, and 128 scan lines are generated. If the sampling disk 50 rotates at 600 rpm, then three vertical scans, 4 inches (101.6 mm) long are produced each revolution. For a potential 4×4-inch (101.6×101.6 mm) beam envelope, the resolution is 1/32 inch (0.793 mm) and 128×128 picture elements (pixels) are produced.

Figure 7:
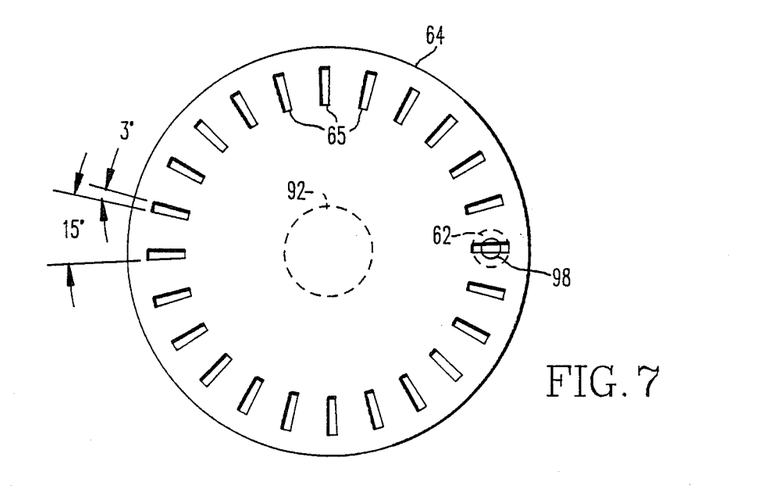
FIG. 7 illustrates a chopper wheel utilized in one embodiment of the present invention.

In FIG. 7 the chopper disk 64 has 24 slots and is designed to rotate at 9600 rpm. The slots 65 may be used for timing purposes, as will be explained, and at 9600 rpm 128 pulses will be produced every 1/30 of a second, corresponding to a single scan line.

Figure 8:
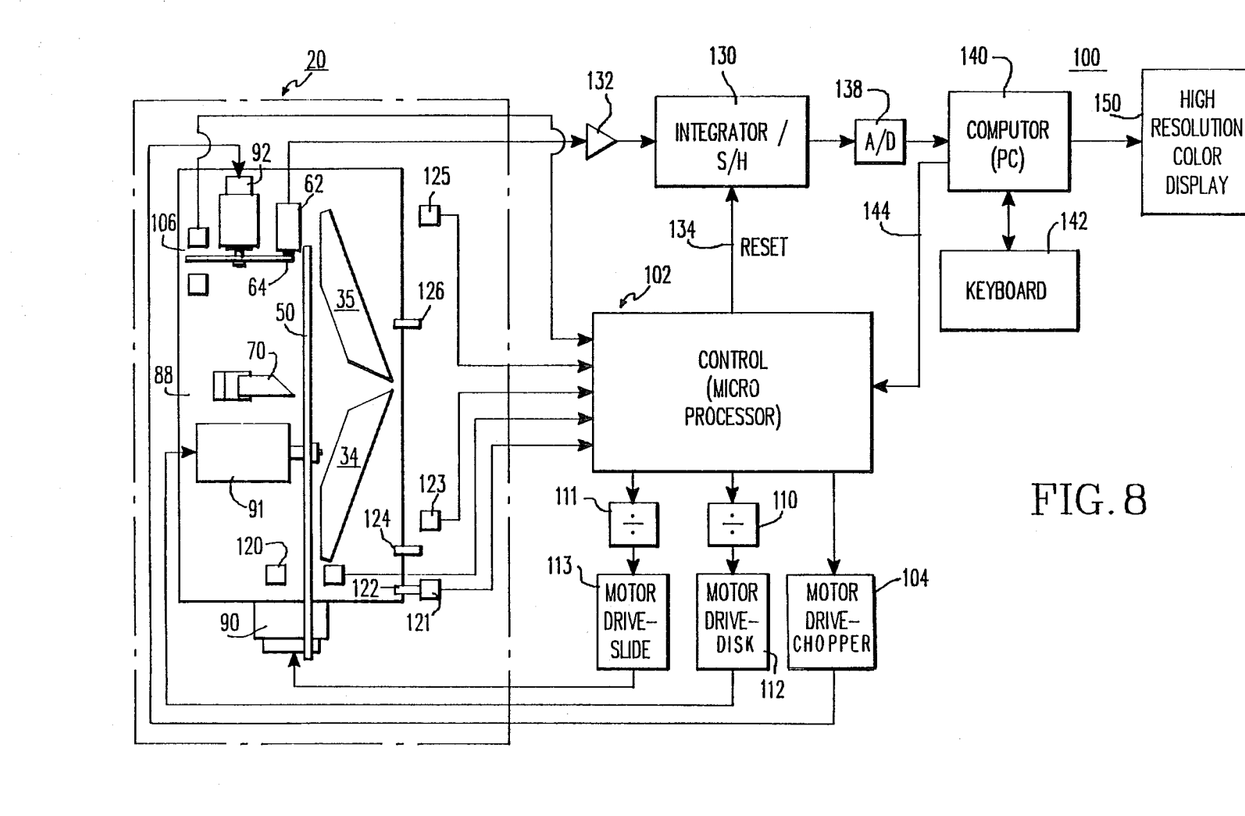
FIG. 8 is a block diagram of the overall apparatus for obtaining a spatial energy density distribution output.

The beam impingement upon the chopper disk 64 is shown in an idealized shape indicated by numeral 98. The shape is generally circular, as opposed to the square cross section seen in FIG. 2, due to significant diffraction effects occurring at the vertical slit 38 between mirrors 34 and 35 as well as at the helical slots 51. As shown in FIG. 7, the angular width between slots is 15°, with each slot being 3°. This angular width of 3° is less than the impingement area 98, and as a slot sweeps past a beam impingement, detector 62 will provide a corresponding output signal which is integrated over the sweep until the area is blocked by a solid portion of the disk, after which a subsequent scanning takes. The integration of the detector output signal, as well as other signal processing and control circuitry for obtaining a display of the 16,384 pixels (128×128) is illustrated in FIG. 8, to which reference is now made.

Circuit means 100 is responsive to the detector output signal generated during the scanning operation to provide an indication of the spatial energy density distribution of the beam being examined. The operation is governed by a control means 102, the function of which may be performed by a small microprocessor. The control means 102 provides an output signal to a first motor drive circuit 104 to drive the chopper disk 64 at the aforementioned 9600 rpm. A sensor arrangement 106, which may be comprised of a light emitter on one side of chopper 64 and a detector on the other side thereof is utilized to generate a timing signal of 3,840 pulses per second, i.e., 128 pulses per 1/30 second, due to the passage of the slots.

This timing signal is provided to control 102 and is divided down in respective divider functions 110 and 111, and thereafter provided to motor drive circuits 112 and 113 to respectively drive the disk motor 91 at 600 rpm and the sliding plate motor 90 at 0.9375 inches (23.81 mm) per second, i.e., 1/32 inch (0.793 mm) per 1/30 of a second.

A plurality of other sensor arrangements are utilized during the scanning operation. More particularly, sensor arrangement 120 which may be similar to arrangement 106, projects light through apertures 56 in disk 50 and signals control 102 at the start of each vertical scan. Sensor 121 in conjunction with projection 122 signals the control 102 when the sliding plate 88 is in a parked position, and sensor 123 in conjunction with projection 124 signals the start of a scanning operation. Sensor 125 in conjunction with projection 126 provides control 102 with an indication of the termination of scanning, after which the sliding plate 88 may be quickly returned to its parked position.

As previously discussed, the output of detector 62 is integrated during passage of a slot past the detector. Accordingly, for this purpose, circuit means 100 includes an integrator 130 along with a sample-and-hold circuit to receive the detector output signal after suitable amplification by preamplifier 132. The timing signal produced by sensor arrangement 106 may be utilized by control 102 to reset the integrator 130, by means of a reset signal on line 134, after each passage of a slot across the detector.

In a preferred embodiment, the sampled output signal is converted to digital form, by means of an analog-to-digital converter 138, and is provided to a computer 140 which may be any one of a variety of personal computers having a keyboard 142 for operator entry of a command to start a scanning operation, and which command is communicated to control 102 via line 144.

The sampled pixel values are stored in the memory of computer 140 which arranges them for display purposes. In a preferred embodiment, the display is in the form of a high resolution color display 150, the arrangement having the ability to resolve many thousands of distinct energy levels each represented by a different color or by a simulated three-dimensional image. The system may be capable of displaying the 128×128 pixel beam image in full screen, ¼ screen or 1/16 screen format, such that up to 16 beam images, can be viewed simultaneously for assessment of beam stability and long-term evaluation of the laser.

I claim:

1. Apparatus for determining the spatial energy density distribution of an energy beam, such as a laser beam, comprising:
   (a) first means for scanning said beam in a first direction and being constructed and arranged to pass only a slit-shaped segment of said beam;
   (b) said first means including first and second mirror members each having a knife edge, with the knife edges being adjacent one another to permit passage of only said slit-shaped segment;

(c) each said mirror member having a highly reflective surface oriented so as to redirect said beam, or any portion thereof which impinges upon said surface, to a direction non-coincident with the beam impingement direction;

(d) second means for scanning said passed slit-shaped segment in a second direction and being constructed and arranged to pass, at any instant of time, only a small elemental portion of said segment;

(e) detector means including a detector operable to provide an output signal in response to impingement of said beam;

(f) means for directing said small elemental portion of said segment to impinge upon said detector; and (g) circuit means responsive to said output of said detector, generated during said scans, to provide an indication of said spatial energy density distribution of said beam.

2. Apparatus according to claim 1, which includes:
(a) energy absorbing means positioned to intercept and absorb the energy of said redirected beam or portion thereof.

3. Apparatus according to claim 1, wherein:
(a) said first and second mirror members are of solid copper.

4. Apparatus according to claim 1, wherein:
(a) said energy absorbing means includes first and second energy absorbers each positioned to receive energy reflected by respective ones of said highly reflective surface portions of said mirror members.

5. Apparatus according to claim 1, which includes:
(a) a plate slidable relative to said beam;
(b) means for driving said plate at a predetermined velocity;
(c) said mirror members being mounted on said plate.

6. Apparatus according to claim 1, wherein:
(a) said second means for scanning includes a disk having at least one helical aperture therein, and which includes:
(b) means for rotating said disk at a predetermined rotational velocity.

7. Apparatus according to claim 6, wherein:
(a) said helical aperture intersects said slit-shaped segment at a right angle.

8. Apparatus according to claim 6, which includes:
(a) a plate slidable relative to said beam;
(b) means for driving said plate at a predetermined velocity;
(c) said disk being mounted on said plate.

9. Apparatus according to claim 1, wherein:
(a) said means for directing includes a mirror, the reflecting surface of which is an off-axis section of a paraboloid.

10. Apparatus according to claim 9, which includes:
(a) a plate slidable relative to said beam;
(b) means for driving said plate at a predetermined velocity;
(c) said mirror being mounted on said plate.

11. Apparatus according to claim 1, wherein:
(a) said detector is of the type which provides an output signal in response to a change in beam energy;
(b) said detector means includes a chopper disk disposed in the beam path ahead of said detector;
(c) said chopper disk including a plurality of apertures to periodically allow and block beam impingement on said detector as said chopper disk rotates, and which includes
(d) means for rotating said chopper disk at a predetermined rotational velocity.

12. Apparatus according to claim 1 which includes:
(a) control means for initiating said scans in said first and second directions, and wherein:
(b) said circuit means includes a computer for storing the output signals provided by said detector and display means for displaying said storage signals.

13. Apparatus according to claim 12, wherein:
(a) said display means is a high resolution color monitor; and
(b) said computer is operable to present said stored signals as a two-dimensional, color-coded display on said monitor.

14. Apparatus according to claim 12, wherein:
(a) said display means is a high resolution color monitor; and
(b) said computer is operable to present said stored signals as a simulated three-dimensional image.

15. Apparatus according to claim 12, wherein:
(a) said detector is of the type which provides an output signal in response to a change in beam energy;
(b) said detector means includes a chopper disk disposed in the beam path ahead of said detector;
(c) said chopper disk including a plurality of apertures to periodically allow and block beam impingement on said detector as said chopper disk rotates, and which includes
(d) means for rotating said chopper disk at a predetermined rotational velocity;
(e) said circuit means includes means for integrating each detector output signal resulting from passage of a said aperture of said chopper disk.

16. Apparatus according to claim 15, wherein:
(a) said control means includes means for resetting said means for integrating after each output signal resulting from said passage of said aperture.

17. In apparatus for obtaining the spatial energy density distribution of a high energy beam, the improvement comprising:
(a) a scanning subsystem for simultaneously scanning said beam in first and second directions to obtain elemental beam samples;
(b) beam power absorbing means;
(c) said scanning subsystem including reflective surfaces facing said beam and constructed and arranged to allow only a portion of said beam to pass, and to reflect the remainder of said beam to said beam power absorbing means; and
(d) means for detecting and displaying the results of said scanning.

* * * * *